Figure 1:
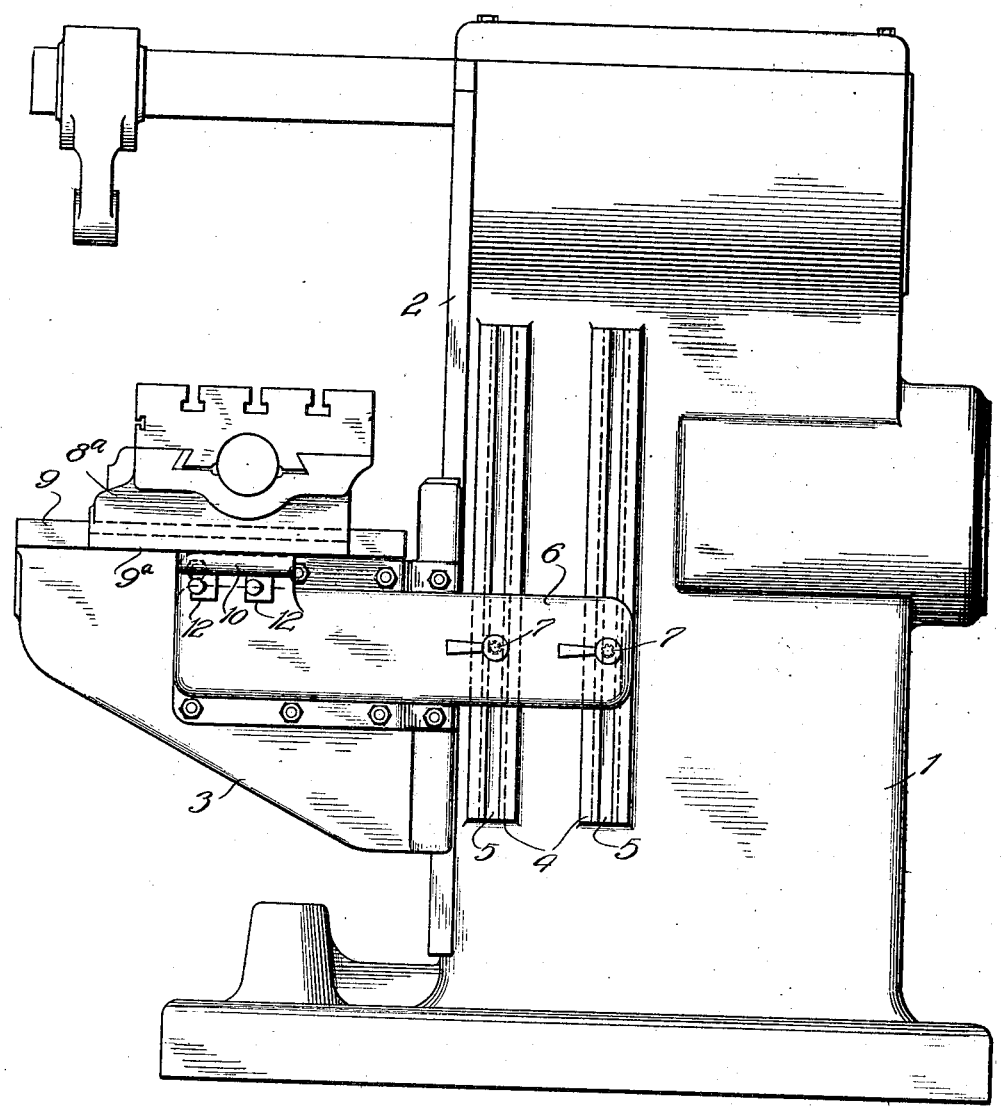

G. D. SUNDSTRAND.
MILLING MACHINE.
APPLICATION FILED JAN. 27, 1919. RENEWED MAR. 22, 1922.

1,430,268.

Patented Sept. 26, 1922.
2 SHEETS—SHEET 1.

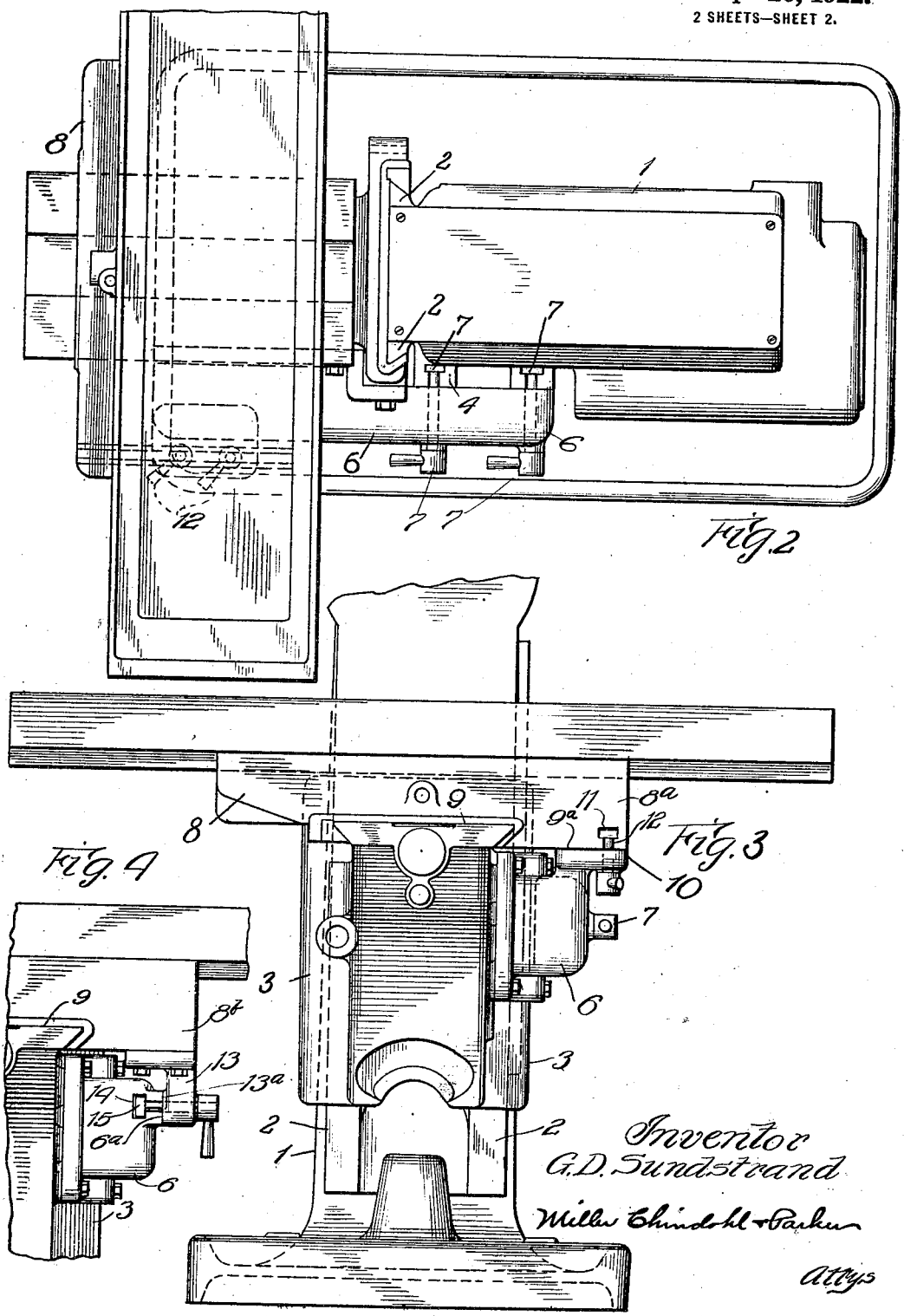

Patented Sept. 26, 1922.

1,430,268

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

MILLING MACHINE.

Application filed January 27, 1919, Serial No. 273,216. Renewed March 22, 1922. Serial No. 545,900.

*To all whom it may concern:*

Be it known that I, GUSTAF DAVID SUNDSTRAND, a citizen of the United States, residing at Rockford, in the county of Winnebago and State of Illinois, have invented a certain new and useful Improvement in Milling Machines, of which the following is a specification.

This invention relates to milling machines of the type comprising a column upon which a knee is vertically adjustable, said knee carrying a saddle which is horizontally adjustable toward and away from the column.

When performing milling operations that involve considerable stress upon the parts, chattering or vibration is apt to occur. This is due, in part, to swinging or lateral movement of the knee with reference to the column, and, in part, to lifting movement of the saddle with reference to the knee. The object of this invention is to prevent any movement of the knee and the saddle with relation to each other or to the column.

In the accompanying drawings, Figure 1 is a fragmental side elevation of a milling machine embodying the features of my invention. Fig. 2 is a fragmental plan view. Fig. 3 is a fragmental front elevation. Fig. 4 illustrates an alternative construction.

In the drawings, 1 denotes the column, there being on the forward side of the column the usual vertical guides 2 for the knee 3. On one side of the column, preferably at the right-hand side thereof, is a suitable arrangement of clamping surfaces, as, for example, the two vertical parallel guides or pads 4. Each of said pads is provided with a T-slot 5 to receive the head of a clamping bolt.

An arm 6 is bolted or otherwise rigidly secured to one side of the knee 3, the rearwardly extending portion of said arm being arranged to slide in contact with the pads 4. The pads 4 are of such length that the arm 6 is in contact therewith in all positions of the knee. 7 are clamping bolts carried by the arm 6, the heads of said bolts lying in the grooves 5. It will be seen that when the bolts 7 are tightened up, the arm 6 will be rigidly clamped to the pads 4, thereby effectively locking the knee against lateral or other movement with reference to the column 1.

The knee is provided with means of any suitable character for guiding the saddle 8 for horizontal movement toward and away from the column. Herein is shown a dovetail guide 9 of the usual form. A portion $8^a$ of the saddle overhangs one side of the knee and is formed with a plane surface $9^a$ adapted to slide in contact with a similar surface upon an extension 10 of the arm 6. The surface $9^a$ is long enough to remain in contact with the extension 10 in all positions of the saddle. In the surface $9^a$ is formed a T-slot 11 to receive the heads of two clamping bolts 12 carried by the extension 10. As shown in Fig. 3, the bolts 12 are located at a considerable distance from the guide 9 for the saddle. It will be apparent that when the bolts 12 are drawn up tight, the saddle will be rigidly clamped to the knee at a point relatively remote from the guide 9, and thus will be firmly held against any lifting or other movement with reference to the knee.

In Fig. 4 is shown an alternative construction wherein a bracket 13 is bolted or otherwise secured to the lower surface of the portion $8^b$ of the saddle, said bracket extending downwardly alongside the arm 6. Said arm 6 and the bracket 13 have contacting plane surfaces $6^a$ and $13^a$, respectively. In the surface $6^a$ is formed a T-slot 14 to receive the heads of one or more clamping bolts 15 carried by the bracket 13. The surface $6^a$ is long enough to remain in contact with the surface $13^a$ in all positions of the saddle.

I claim as my invention:

1. A milling machine having, in combination, a column, a guide on the side of the column, a knee vertically slidable upon said guide, a saddle horizontally movable upon the knee toward and away from the column, an arm rigidly secured to one side of the knee and extending rearwardly alongside of the column, means for clamping said arm to the column in any position of the knee upon said guide, a member upon the same side of the knee, and means for clamping the saddle to said member in any position of the saddle upon the knee.

2. A milling machine having, in combination, a column, a knee vertically adjustable upon the column, a guide on the knee, a saddle mounted on said guide for horizontal movement, a member rigidly connected to one side of the knee and projecting to a substantial distance from said guide, the saddle having a plane surface arranged to slide in contact with a plane surface on said member, the plane surface of the saddle having a T-slot opening downwardly, and a clamping bolt carried by said member and having a head lying in said slot.

3. A milling machine having, in combination, a column, a knee vertically adjustable upon the column, a guide on the knee, a saddle mounted on said guide for horizontal movement, a member rigidly connected to one side of the knee and projecting to a substantial distance from said guide, the saddle being arranged to slide in contact with said member, and means for clamping the saddle to said member in any position of the saddle on said guide.

4. A milling machine having, in combination, a column having a guide upon its side, a knee vertically slidable upon said guide, an arm rigidly connected to one side of the knee and projecting alongside the column, and means for clamping the projecting portion of said arm to the side of the column in any position of the knee upon said guide.

5. A milling machine having, in combination, a column, a slidable knee, guides on said column for said knee, and means engaging said knee and said column at points remote from said guides for clamping said knee in position.

6. A milling machine having, in combination, a knee and a saddle slidable on said knee, guides on said knee for said saddle, and means engaging said saddle and said knee at points remote from said guides for clamping said saddle in position.

7. A milling machine having, in combination, a column, guides on said column, a knee slidable on said guides, guides on said knee, a saddle slidable on said last mentioned guides, and a single rigid means adapted to be attached to said saddle, knee and column, at points remote from all said guides for clamping said saddle in position on said knee and said knee in position on said column.

8. A milling machine having, in combination, a column, guides on said column, a knee slidable on said guides, and means independent of said guides for clamping said knee in position with respect to said column.

9. A milling machine having, in combination, a knee, guides on said knee, a saddle slidable on said guides, and means independent of said guides for clamping said saddle in position on said knee.

In testimony whereof, I have hereunto set my hand.

GUSTAF DAVID SUNDSTRAND.